United States Patent [19]
Takahashi et al.

[11] Patent Number: 5,606,960
[45] Date of Patent: Mar. 4, 1997

[54] METHOD FOR CONTROLLING VALVE OPERATING CHARACTERISTIC AND AIR-FUEL RATIO IN INTERNAL COMBUSTION ENGINE

[75] Inventors: Nobu Takahashi; Shinya Fukushima, both of Saitama, Japan

[73] Assignee: Honda Giken Kogyo Kabushiki Kaisha, Tokyo, Japan

[21] Appl. No.: 480,268

[22] Filed: Jun. 7, 1995

[30] Foreign Application Priority Data

Sep. 28, 1994 [JP] Japan .................................. 6-233135

[51] Int. Cl.$^6$ .............................. F02D 43/04; F02D 13/02
[52] U.S. Cl. ........................................ 123/684; 123/90.15
[58] Field of Search ............................. 123/90.15, 90.16, 123/681, 682, 683, 684, 687

[56] References Cited

U.S. PATENT DOCUMENTS 5,060,604  10/1991  Seki et al. ............................. 123/90.16
5,220,904   6/1993  Miyashita et al. ................. 123/90.16 X
5,443,050   8/1995  Hitomi et al. ....................... 123/681 X

FOREIGN PATENT DOCUMENTS 3-488    1/1991   Japan .

Primary Examiner—Tony M. Argenbright
Attorney, Agent, or Firm—Lyon & Lyon

[57] ABSTRACT

In an internal combustion engine in which the valve operating characteristic for intake valves can be switched, and the air-fuel ratio can be switched between a relatively lean level and a relatively rich level, the air-fuel ratio is switched in accordance with a change in engine operating condition. The valve operating characteristic for intake valves is switched substantially synchronously with the switching of the air-fuel ratio, between an operating condition-suited valve operating characteristic suited to an engine operating condition before the switching of the air-fuel ratio and an operating condition-suited valve operating characteristic suited to an engine operating condition after the switching of the air-fuel ratio, via an operating condition-unsuited valve operating characteristic which is not suited to the engine operating condition after the switching of the air-fuel ratio, so as to provide an engine output which is a middle value between engine outputs before and after the switching of the air-fuel ratio. Thus, it is possible to moderate the torque shock produced upon the switching of the air-fuel ratio, while inhibiting the generation of NOx.

1 Claim, 18 Drawing Sheets

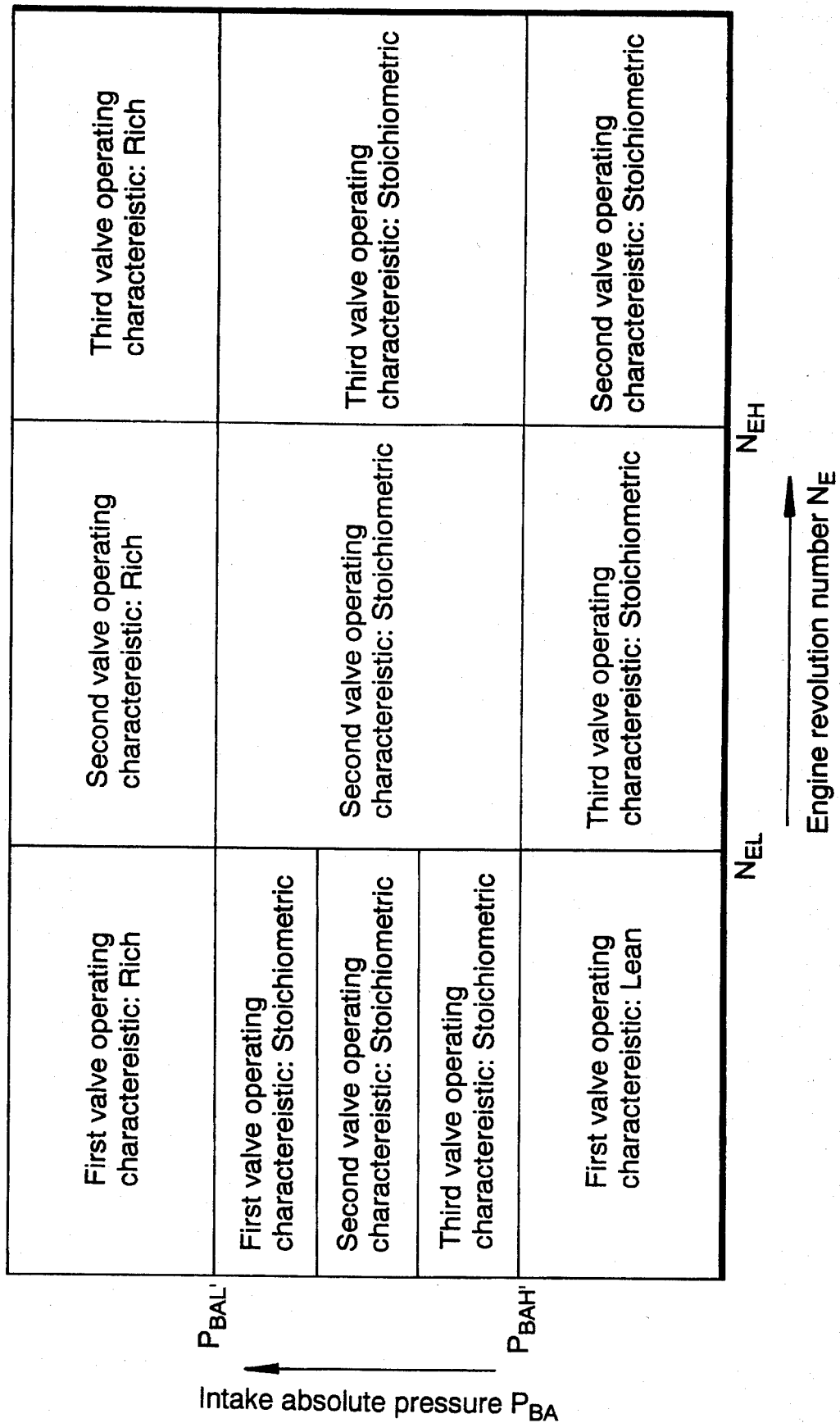

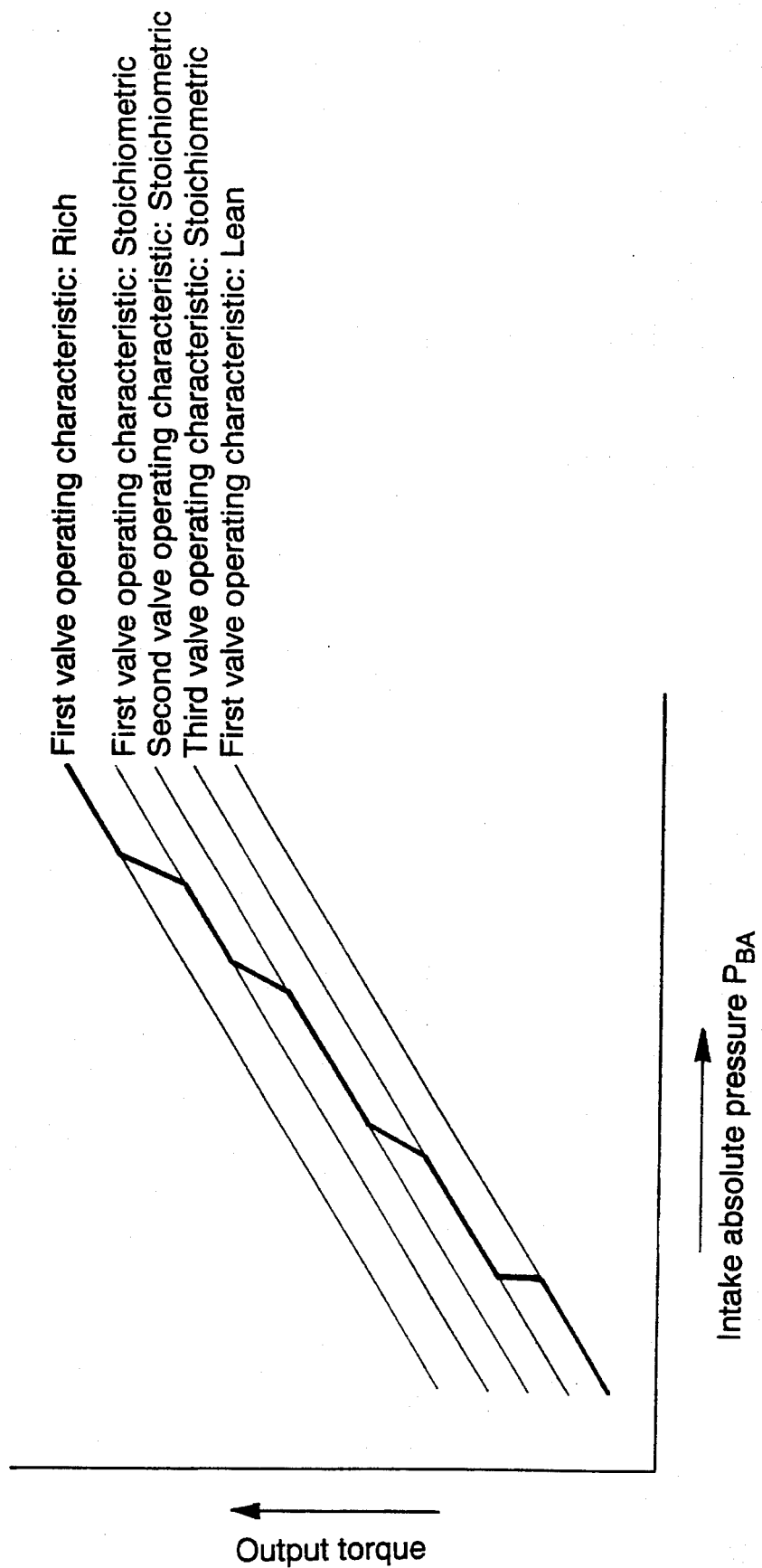

5,606,960

METHOD FOR CONTROLLING VALVE OPERATING CHARACTERISTIC AND AIR-FUEL RATIO IN INTERNAL COMBUSTION ENGINE

BACKGROUND OF THE INVENTION

1. Field of the Invention

The present invention relates to a method of controlling the valve operating characteristic and the air-fuel ratio to moderate a torque shock produced upon switching of the air-fuel ratio in an internal combustion engine in which the valve operating characteristic for intake valves can be switched between a plurality of operating condition-suited valve operating characteristics suited to an engine operating condition represented by at least one of an engine revolution number and an engine load, and the air-fuel ratio can be switched between a relatively lean level and a relatively rich level.

2. Description of Prior Art

It is conventionally known that if the air-fuel ratio is switched between the relatively lean level and the relatively rich level, a torque shock is produced. In order to moderate such a torque shock, it is a conventional common practice to gradually change the air-fuel ratio, or to retard the igniting time point in promptly switching the air-fuel ratio. It is also already known that in changing the air-fuel ratio from a rich air-fuel mixture state to a lean air-fuel mixture state, the amount of air bypassing a throttle valve is increased without changing of the amount of fuel supplied, thereby moderating the torque shock, as disclosed in Japanese Patent Publication No. 488/1991.

In the technique in which the air-fuel ratio is gradually changed as in the prior art, an increase in amount of NOx in an exhaust gas in the middle of switching between the lean state and a stoichiometric state cannot be avoided. Further, in the technique disclosed in Japanese Patent Publication No. 488/1991, it is conventionally difficult to insure the bypassing air amount by provision of only a bypass passage connected to an intake passage, and it is necessary to newly provide a bypass passage having a bypassing air amount control valve therein. Moreover, if the bypassing air amount is increased during a low-load operation using a lean air-fuel mixture, it is difficult to control the throttle opening degree and hence, it is difficult to maintain the stability during an operation with a small intake air amount, such as during an idle operation and during a partial operation.

SUMMARY OF THE INVENTION

Accordingly, it is an object of the present invention to provide a method of controlling the valve operating characteristic and the air-fuel ratio in an internal combustion engine, wherein the above problems can be overcome, and the torque shock produced upon the switching of the air-fuel ratio can be effectively inhibited.

To achieve the above object, according to the present invention, there is provided a method for controlling a valve operating characteristic and an air-fuel ratio in an internal combustion engine in which the valve operating characteristic for an intake valve can be switched over between a plurality of operating condition-suited valve operating characteristics suited to an engine operating condition represented by at least one of an engine revolution number and an engine load, and the air-fuel ratio can be switched over between a relatively lean level and a relatively rich level, the method comprising the steps of: switching over the air-fuel ratio in accordance with a change in the engine operating condition; and switching over the valve operating characteristic for the intake valve substantially synchronously with the switching over of the air-fuel ratio, from one operating condition-suited valve operating characteristic suited to one engine operating condition before the switching over of the air-fuel ratio to another operating condition-suited valve operating characteristic suited to another engine operating condition after the switching over of the air-fuel ratio, via an operating condition-unsuited valve operating characteristic which is not suited to the another engine operating condition after the switching over of the air-fuel ratio, so as to provide an engine output which is of an intermediate level between the engine outputs before and after the switching over of the air-fuel ratio.

If the air-fuel ratio is suddenly changed during operation of the engine, the engine output torque is considerably varied. However, the output torque is stepwise varied by controlling the valve operating characteristic for the intake valves, in the course of switching of the air-fuel ratio, via the operating condition-unsuited valve operating characteristic which is not suited to the engine operating condition after the switching of the air-fuel ratio, so as to provide an engine output which is a middle value between engine outputs before and after the switching of the air-fuel ratio. Thus, even if the air-fuel ratio is suddenly changed so as to inhibit the generation of NOx, the torque shock can be moderated.

The above and other objects, features and advantages of the invention will become apparent from the following description of the preferred embodiments taken in conjunction with the accompanying drawings.

3

Figure 12:
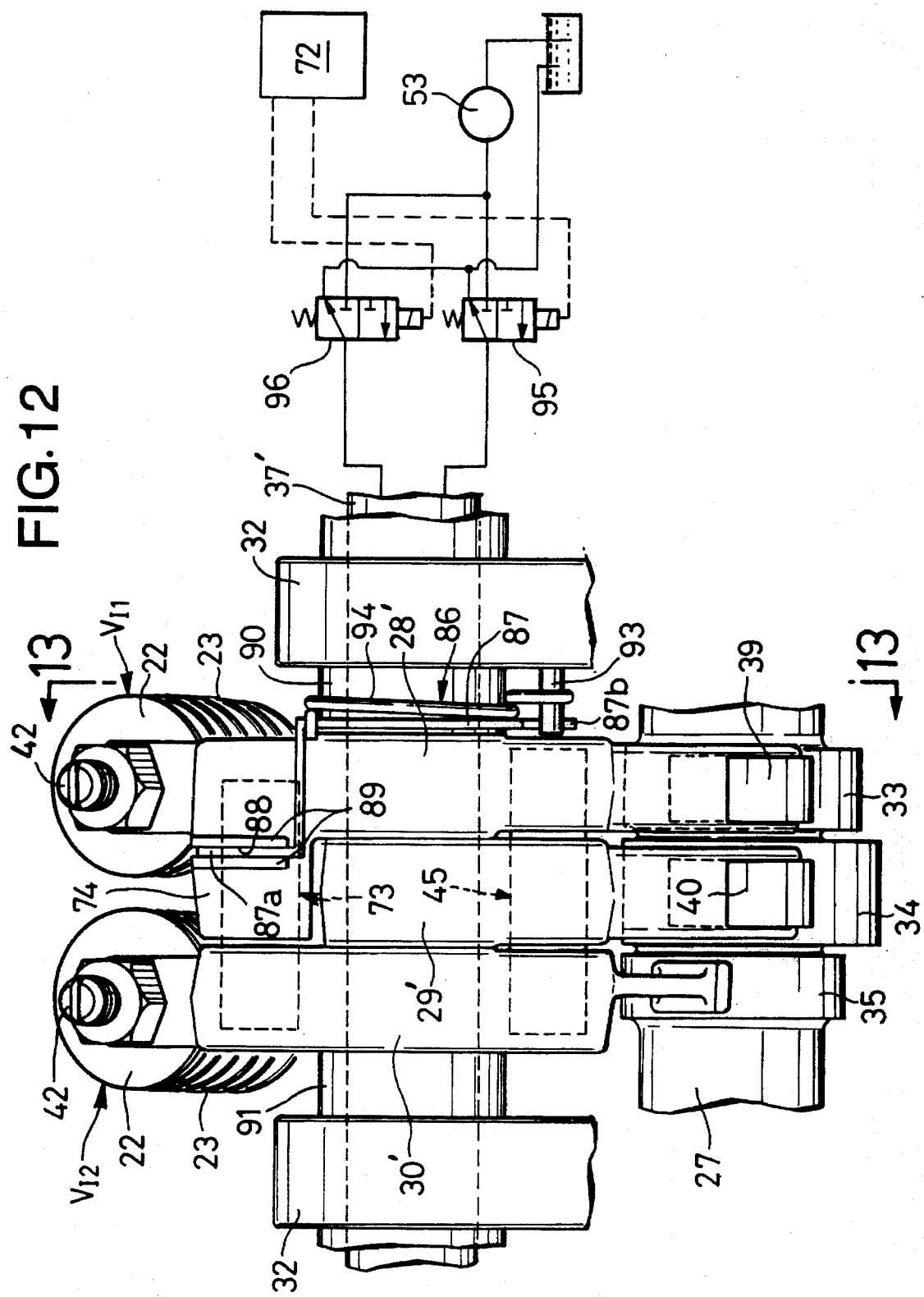
FIG. 12 is a plan view illustrating an intake valve operating device to which a second embodiment of the present invention is applied.
Figure 13:
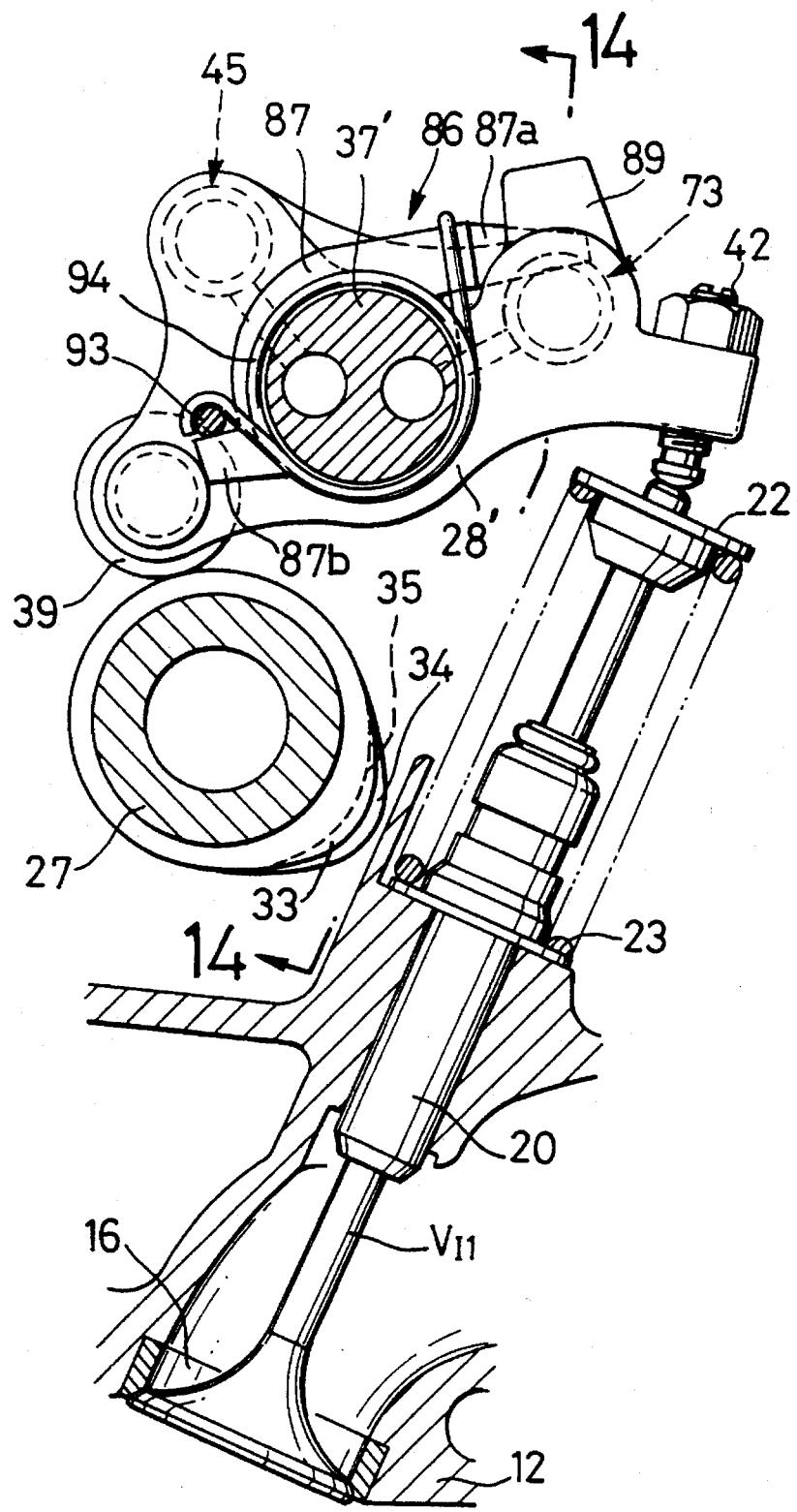
Figure 14:
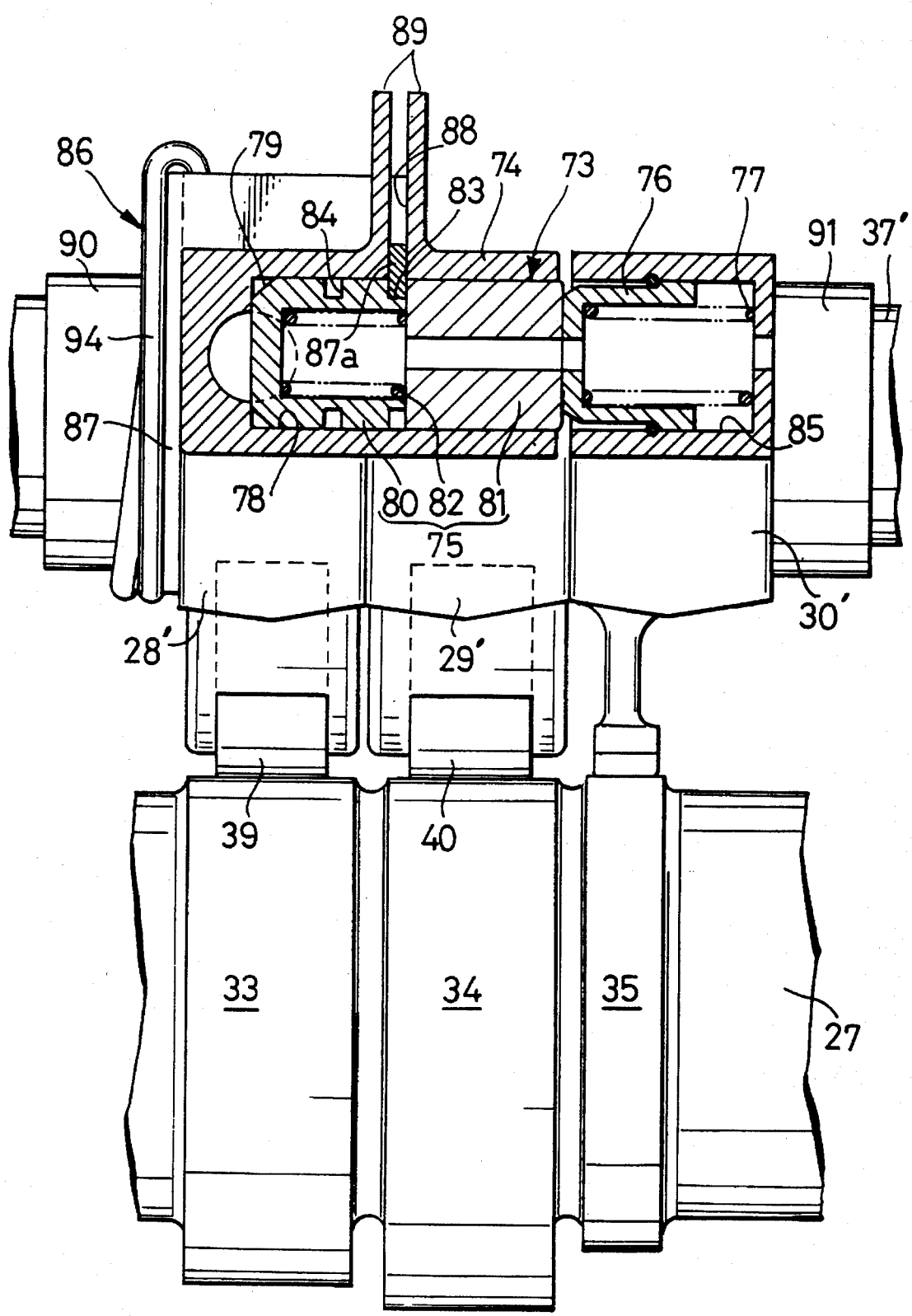
Figure 15:
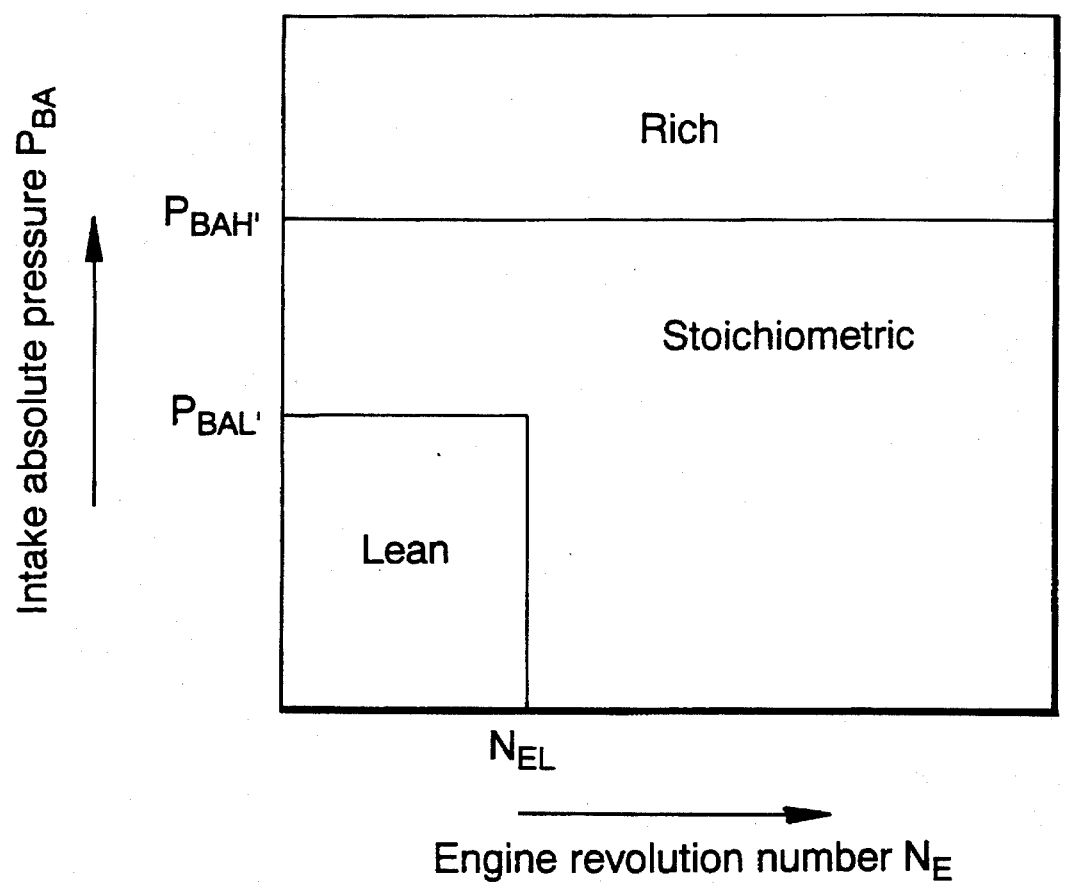
Figure 16:
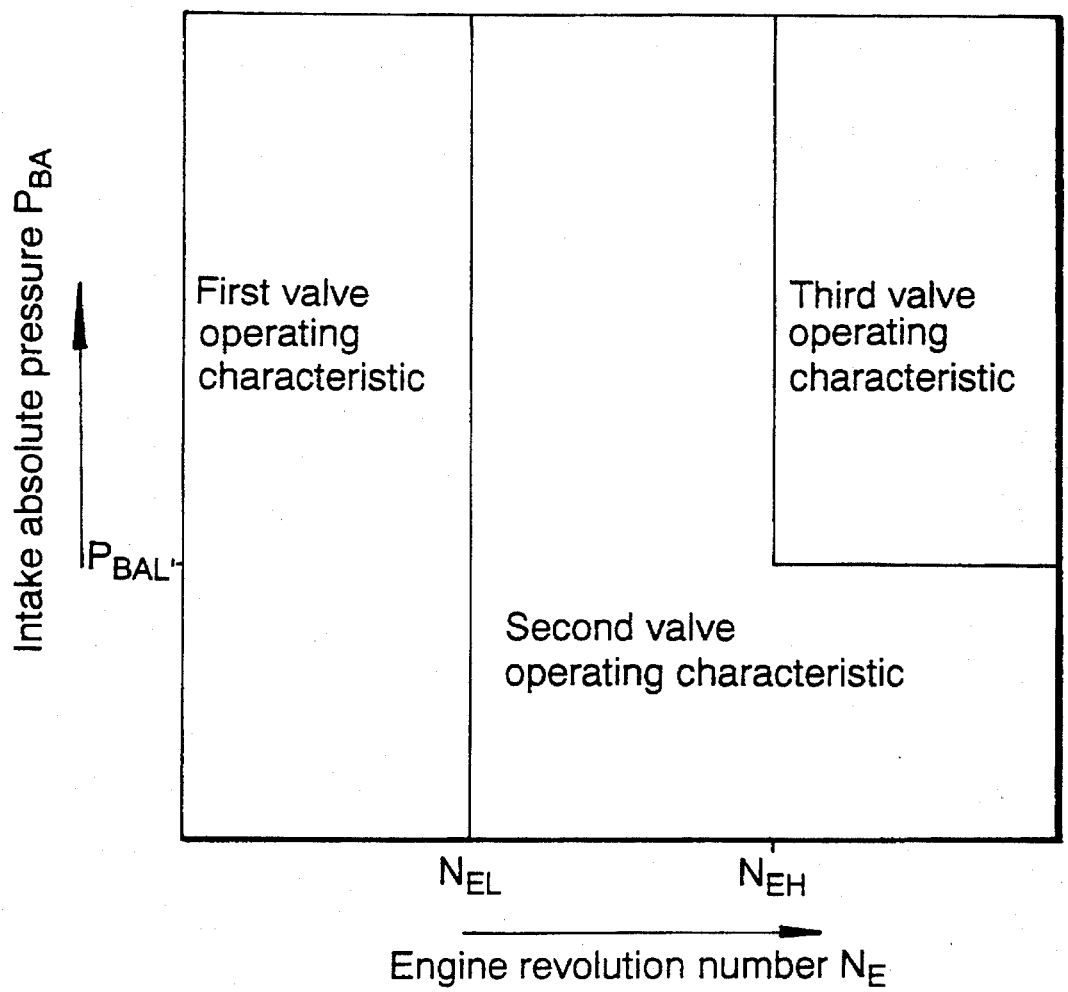

FIG. 13 is a sectional view taken along a line 13—13 in FIG. 12;

FIG. 14 is a sectional view taken along a line 14—14 in FIG. 13;

FIG. 15 is a diagram illustrating an air-fuel ratio switching map;

FIG. 16 is a diagram illustrating a valve operating characteristic switching map suited to an engine operating condition;

FIG. 17 is a diagram illustrating a map for switching the air-fuel ratio and the valve operating characteristic; and FIG. 18 is a diagram illustrating a variation in output torque attendant upon the switching of the air-fuel ratio and the valve operating characteristic.

DESCRIPTION OF THE PREFERRED EMBODIMENTS

The present invention will now be described by way of preferred embodiments in connection with the accompanying drawings.

A first embodiment of the present invention will be described with reference to FIGS. 1 to 11.

Figure 1:
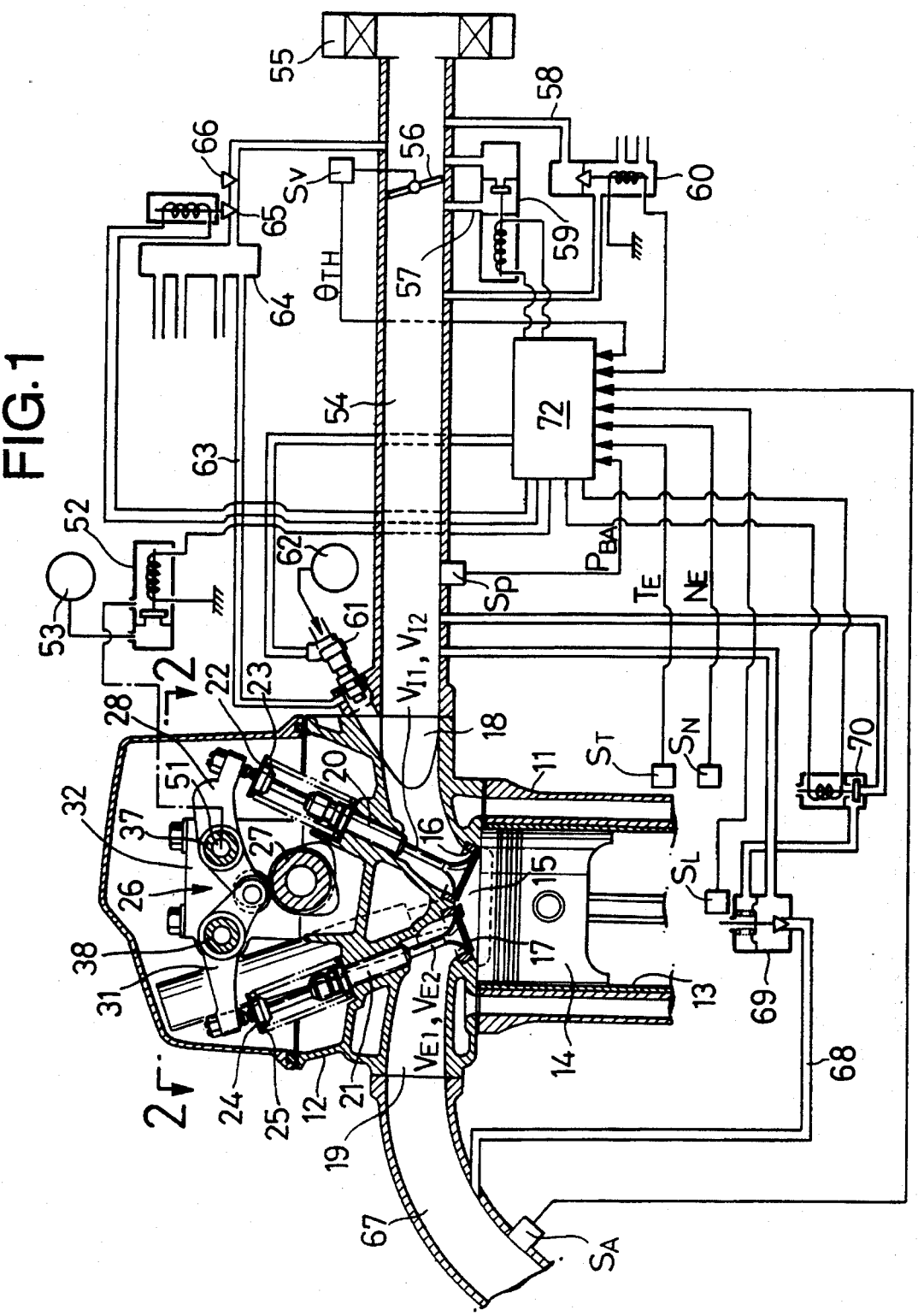
FIG. 1 is a view illustrating the entire arrangement of an internal combustion engine to which a first embodiment of the present invention is applied.

Referring first to FIG. 1, an essential portion of an engine body is constituted in a following manner in an SOHC type multi-cylinder internal combustion engine. A cylinder head 12 is coupled to an upper surface of a cylinder block 11, and a piston 14 is slidably received in each of a plurality of cylinders 13 provided in the cylinder block 11 to define a combustion chamber 15 between an upper surface of the piston 14 itself and the cylinder head 12. A pair of intake valve bores 16 and a pair of exhaust valve bores 17 are provided in the cylinder head 12 to open into a ceiling surface of the combustion chamber 15. The intake valve bores 16 are connected to a single intake port 18 which opens into one side of the cylinder head 12, and the exhaust valve bores 17 are connected to a single exhaust port 19 which opens into the other side of the cylinder head 12.

Figure 2:
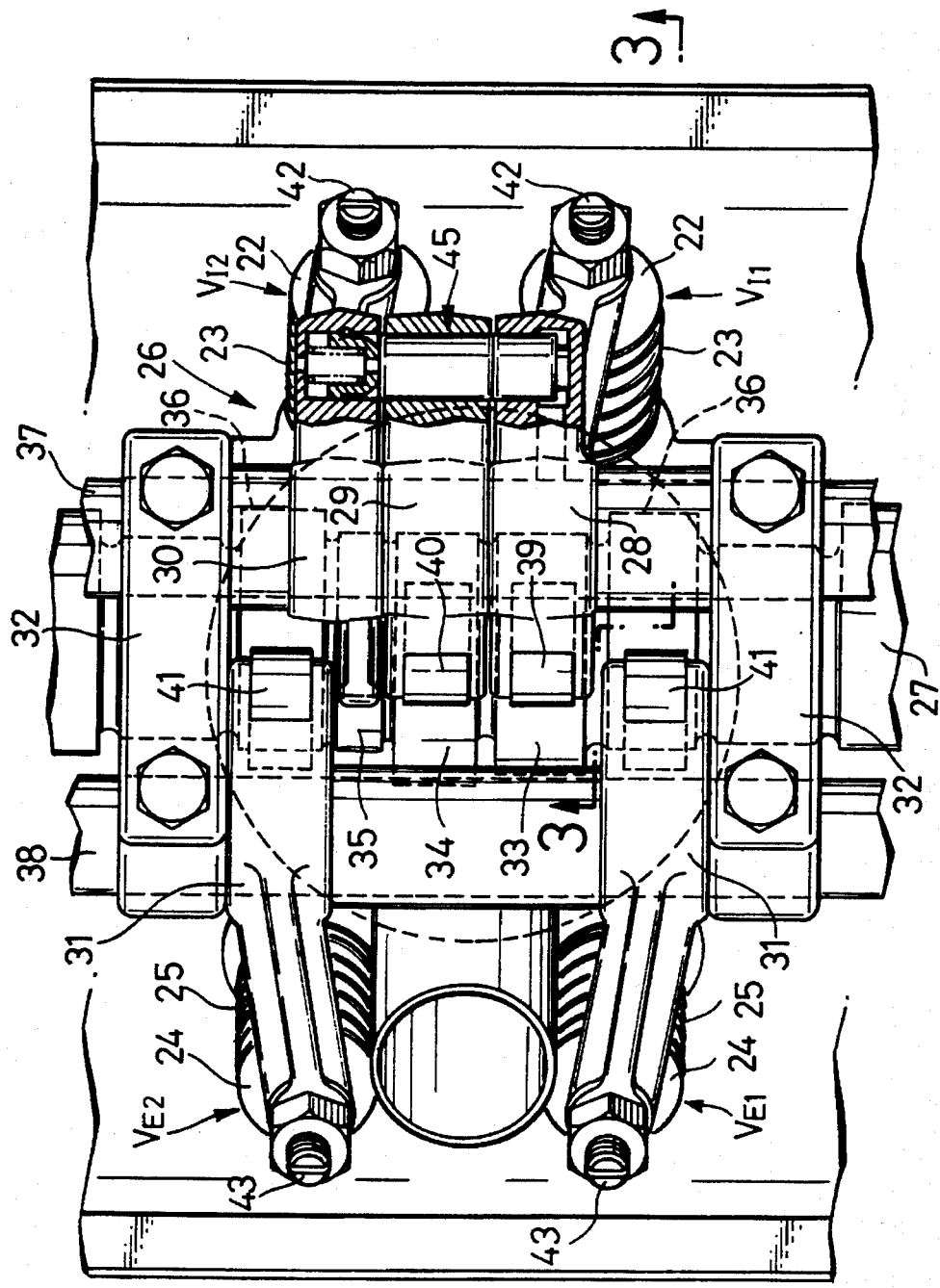
FIG. 2 is an enlarged cross-sectional plan view taken along a line 2—2 in FIG. 1.
Figure 3:
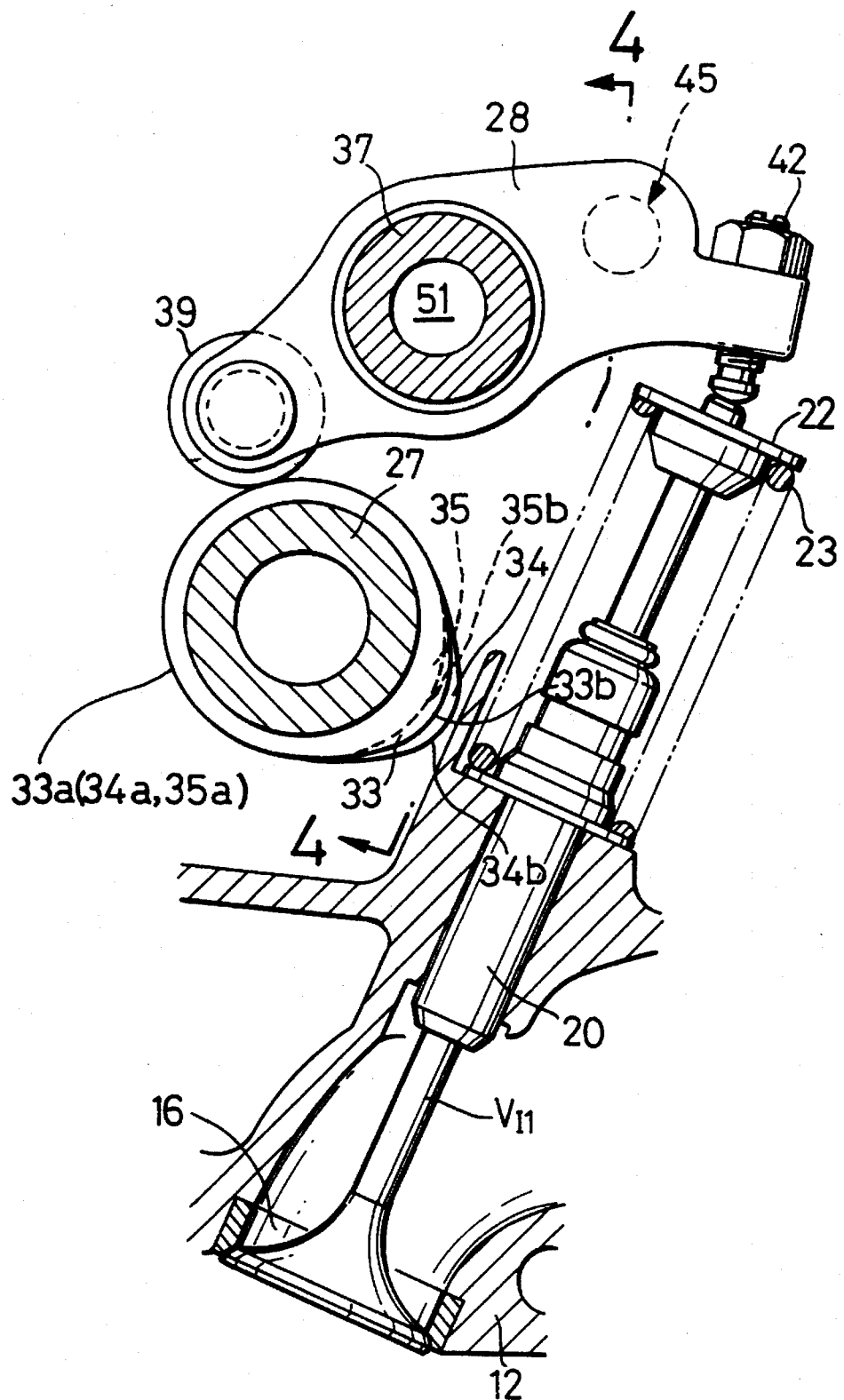
FIG. 3 is a sectional view taken along a line 3—3 in FIG. 2.

Referring also to FIGS. 2 and 3, a pair of intake valves $V_{I1}$ and $V_{I2}$ capable of opening and closing the intake valve bores 16 are slidably fitted in a pair of guide sleeves 20 disposed in the cylinder head 12. Coiled valve springs 23, 23 are interposed between the cylinder head 12 and retainers 22, 22 fixed to upper ends of the intake valves $V_{I1}$ and $V_{I2}$ protruding from the guide sleeves 20, so as to surround the intake valves $V_{I1}$ and $V_{I2}$, respectively, so that the intake valves $V_{I1}$ and $V_{I2}$ are biased upwardly, i.e., in closing directions by the valve springs 23, 23. Further, a pair of exhaust valves $V_{E1}$ and $V_{E2}$ are slidably fitted in a pair of guide sleeves 21 disposed in the cylinder head 12. Coiled valve springs 25, 25 are interposed between the cylinder head 12 and retainers 24, 24 fixed to upper ends of the exhaust valves $V_{E1}$ and $V_{E2}$ protruding from the guide sleeves 21, so as to surround the exhaust valves $V_{E1}$ and $V_{E2}$, respectively, so that the exhaust valves $V_{E1}$ and $V_{E2}$ are biased upwardly, i.e., in closing directions by the valve springs 25, 25.

A valve operating device 26 is connected to the intake valves $V_{I1}$ and $V_{I2}$ and the exhaust valves $V_{E1}$ and $V_{E2}$. The valve operating device 26 includes a single cam shaft 27 operatively connected at a reduction ratio of ½ to a crankshaft (not shown), first, second and third intake-side rocker arms 28, 29 and 30 for converting the rotating motion of the cam shaft 27 into opening and closing motions of the intake valves $V_{I1}$ and $V_{I2}$, and a pair of exhaust-side rocker arms

4

31, 31 for converting the rotating motion of the cam shaft 27 into opening and closing motions of the exhaust valves $V_{E1}$ and $V_{E2}$.

The cam shaft 27 is rotatably carried by the cylinder head 12 and holders 32 coupled to the cylinder head 12 on opposite sides of the cylinder 13 along an axis of the crankshaft, and has a horizontal axis perpendicular to the axis of the cylinder 13.

Integrally provided on the cam shaft are a first intake-side cam 33, a second intake-side cam 34 disposed adjacent one side of the first intake-side cam 33, and a substantially stopping cam 35 disposed adjacent one side of the second intake-side cam 34, as well as an exhaust-side cams 36, 36 disposed on opposite sides of the first intake-side cam 33 and the substantially stopping cam 35.

Referring to FIG. 3, the first intake-side cam 33 has, around its outer periphery, a base-circle portion 33a formed into a arcuate shape about an axis of the cam shaft 27, and a cam lobe 33b protruding radially outwardly from the base-circle portion 33a. The second intake-side cam 34 has, around its outer periphery, a base-circle portion 34a formed into a arcuate shape about the axis of the cam shaft 27 with the same radius as the base-circle portion 33a of the first intake-side cam 33, and a cam lobe 34b protruding radially outwardly from the base-circle portion 34a in an amount larger than that of the cam lobe 33b of the first intake-side cam 33. Further, the substantially stopping cam 35 has, around its outer periphery, a base-circle portion 35a formed into a arcuate shape about the axis of the cam shaft 27 with the same radius as the base-circle portions 33a and 34a, and a cam lobe 35b slightly protruding radially outwardly from the base-circle portion 34a at a location corresponding to the cam lobes 33b and 34b. When the intake valve $V_{I2}$ is opened, the substantially stopping cam 35 functions to slightly open the intake valve $V_{I2}$, but to retain the intake valve $V_{I2}$ substantially in a stopped state.

The first intake-side rocker arm 28 is operatively connected to one of the intake valves $V_{I1}$, and the third intake-side rocker arm 30 is operatively connected to the other intake valves $V_{I2}$. The second intake-side rocker arm 29 capable of being liberated relative to both the intake valves $V_{I1}$ and $V_{I2}$ is disposed between the first and third intake-side rocker arms 28 and 30. The intake-side rocker arms 28, 29 and 30 are swingably carried on the intake-side rocker shaft 37. The exhaust-side rocker arms 31, 31 independently operatively connected to the exhaust valves $V_{E1}$ and $V_{E2}$ are swingably carried on an exhaust-side rocker shaft 38.

A roller 39 is pinned at one end of the first intake-side rocker arm 28 to come into rolling contact with the first intake-side cam 33, and a roller 40 is pinned at one end of the second intake-side rocker arm 29 to come into rolling contact with the second intake-side cam 34. One end of the third intake-side rocker arm 30 is in sliding contact with the substantially stopping cam 35. Rollers 41, 41 are pinned at one ends of the exhaust-side rocker arms 31, 31 to come into rolling contact with the exhaust-side cams 36, 36, respectively.

Tappet screws 42, 42 are advanceably and retreatably screwed into the other ends of the first and third intake-side rocker arms 28 and 30 to abut against upper ends of the intake valves $V_{I1}$ and $V_{I2}$, respectively, so that the intake valves $V_{I1}$ and $V_{I2}$ are opened and closed response to the swinging movements of the first and third intake-side rocker arms 28 and 30. Tappet screws 43, 43 are advanceably and retreatably screwed into the other ends of the exhaust-side rocker arms 31 and 31 to abut against upper ends of the exhaust valves $V_{E1}$ and $V_{E2}$, respectively, so that the exhaust valves $V_{E1}$ and $V_{E2}$ are opened and closed response to the swinging movements of the exhaust-side rocker arms 31 and 31.

The first and third intake-side rocker arms 28 and 30 are biased in directions to abut against the first intake-side cam 33 and the substantially stopping cam 35 by the valve springs 23, 23 of the intake valves $V_{I1}$ and $V_{I2}$ operatively connected to the rocker arms 28, 30, while the second intake-side rocker arm 29 is resiliently biased in a direction to bring the roller 40 into contact with the second intake-side cam 34 by a lost motion mechanism which is not shown.

Figure 4:
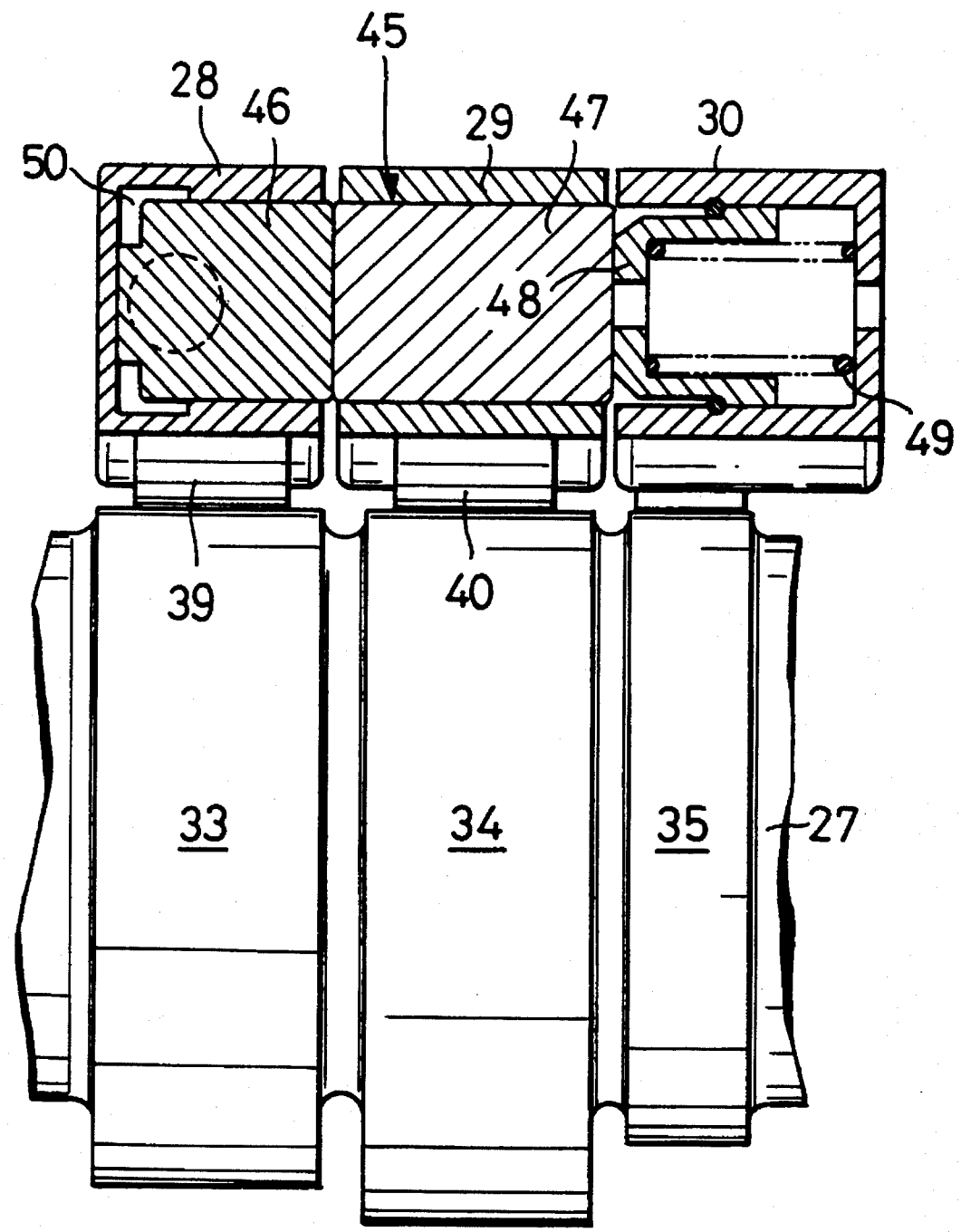
FIG. 4 is a sectional view taken along a line 4—4 in FIG. 3.

Referring to FIG. 4, a valve operating characteristic changeover means 45 is provided in the first, second and third rocker arms 28, 29 and 30, so that the valve operating characteristics for the intake valves $V_{I1}$ and $V_{I2}$ are changed over between two stages, while the valve operating characteristics for the exhaust valves $V_{E1}$ and $V_{E2}$ are invariable.

The valve operating characteristic changeover means 45 includes a connecting piston 46 capable of connecting the first and second intake-side rocker arms 28 and 29 to each other, a connecting pin 47 capable of connecting the second and third rocker arms 29 and 30 to each other, a limiting member 48 for limiting the movements of the connecting piston 46 and the connecting pin 47, and a return spring 49 for biasing the connecting piston 46, the connecting pin 47 and the limiting member 48 to disconnecting directions.

The connecting piston 46 is slidably received in the first intake-side rocker arm 28 for movement in an axial direction parallel to the intake-side rocker shaft 37. A hydraulic pressure chamber 50 is defined between one end of he connecting piston 46 and the first intake-side rocker arm 28 to lead to an oil passage 51 in the intake-side rocker shaft 37. The oil passage 51 is connected to a hydraulic pressure source 53 through a connection switchover solenoid control valve 52, as shown in FIG. 1.

The connecting pin 47 with one end abutting against the other end of the connecting piston 46 is slidably received in the second intake-side rocker arm 29 for sliding movement in an axial direction parallel to the intake-side rocker shaft 37. Further, the bottomed cylindrical limiting member 48 abutting against the other end of the connecting pin 47 is slidably received in the third intake-side rocker arm 30 for sliding movement in an axial direction parallel to the intake-side rocker shaft 37. The return spring 49 is mounted under compression between the limiting member 48 and the third intake-side rocker arm 30.

In such valve operating characteristic changeover means 45, in a condition in which the hydraulic pressure in the hydraulic pressure chamber 50 has been released, abutment faces of the connecting piston 46 and the connecting pin 47 are in a position corresponding to a boundary between the first and second intake-side rocker arms 28 and 29, and abutment faces of the connecting pin 47 and the limiting member 48 are in a position corresponding to a boundary between the second and third intake-side rocker arms 29 and 30. Thus, the rocker arms 28, 29 and 30 are in states in which they are angularly displaceable relative to one another, so that the first intake-side rocker arm 28 is swung by the first intake-side cam 33 in response to the rotation of the cam shaft 27, whereby one of the intake valves $V_{I1}$ is opened and closed with a timing and a lift amount corresponding to the shape of the first intake-side cam 33. That is, this valve operating characteristic for the intake valves $V_{I1}$ and $V_{I2}$ is a first valve operating characteristic. The third intake-side rocker arm 30 in sliding contact with the substantially stopping cam 35 is brought into a substantially stopped state, so that the other intake valve $V_{I2}$ can be substantially stopped. Further, the second intake-side rocker arm 29 is swung by the second intake-side cam 34: however, such swinging movement exerts no influence to the first and third intake-side rocker arms 28 and 30.

When a high hydraulic pressure is applied to the hydraulic pressure chamber 50, the connecting piston 46 is intended to be moved in a direction to increase the volume of the hydraulic pressure chamber 50 against a spring force of the return spring 49, while urging the connecting pin 47. When axes of the connecting piston 46, the connecting pin 47 and the limiting member 48 are aligned with one another, i.e., when the intake-side rocker arms 28, 29 and 30 have reached stationary states, the connecting piston 46 is fitted into the second intake-side rocker arm 29, and in response to this, the connecting pin 47 is fitted into the third intake-side rocker arm 30, thereby bringing the intake-side rocker arms 28, 29 and 30 into connected states. Therefore, the first and third intake-side rocker arms 28 and 30 are swung long with the second intake-side rocker arm 29 swung by the second intake-side cam 34, whereby the intake valves $V_{I1}$ and $V_{I2}$ are opened and closed with a timing and a lift amount corresponding to the shape of the second intake cam 34. That is, this valve operating characteristic for the intake valves $V_{I1}$ and $V_{I2}$ is a second valve operating characteristic.

Referring again to FIG. 1, the intake port 18 in the cylinder head 12 is connected to an air cleaner 55 through an intake passage 54, and a throttle valve 56 is incorporated in the intake passage 54. A bypass passage 57 and a first idle passage 58 are connected in parallel to the intake passage to bypass the throttle valve 56. A bypass solenoid control valve 59 is incorporated in the bypass passage 57, and a first idle solenoid control valve 60 is incorporated in the first idle passage 58.

A fuel injection valve 61 is mounted in an end of the intake passage 54 adjacent the cylinder head 12 for uniformly injecting fuel through the intake port 18 toward both the intake valve bores 16, and a fuel supply source 62 is connected to the fuel injection valve 61. An assist air passage 63 for supplying assist air to the fuel injection valve 61 is connected to an air header 64 which is connected to the intake passage 54 at a location upstream from the throttle valve 56 through an electromagnetic air-amount control valve 65 and an idle adjusting screw 66.

An exhaust passage 67 is connected to the exhaust port 19 in the cylinder head 12 and to a catalytic converter and a silencer (both not shown). An exhaust gas circulating passage 68 is provided to connect the middle of the exhaust passage 67 with a portion of the intake passage 54 downstream from the throttle valve 56. An exhaust gas circulation control valve 69 is incorporated in the middle of the exhaust gas circulating passage 68, and an electromagnetic pilot valve 70 is provided between a portion of the intake passage 54 downstream from the throttle valve 56 and the atmosphere.

The operations of the connection switchover solenoid control valve 52, the bypass solenoid control valve 59, the first idle solenoid control valve 60, the fuel injection valve 61, the electromagnetic air-amount control valve 65 and the electromagnetic pilot valve 70 are controlled by a control means 72 comprising a computer. Supplied to the control means 72 are an intake absolute pressure $P_{BA}$ detected by an intake pressure sensor Sp, an engine water temperature $T_E$ detected by an engine cooling water temperature sensor $S_T$, an engine revolution-number $N_E$ detected by a revolution-number sensor $S_N$, a detection value detected by an air-fuel ratio sensor $S_A$ for detecting an air-fuel ratio from the composition of an exhaust gas in the exhaust passage 67, a throttle opening degree $\theta_{TH}$ detected by a throttle sensor $S_v$, and an opening degree of the exhaust gas circulation control valve 69 detected by a lift sensor $S_L$, i.e., an amount of exhaust gas circulated.

Thus, the control means 72 is capable of controlling the amount of fuel injected from the fuel injection valve 61 to change over the air-fuel ratio from one of a lean level (a lean air-fuel mixture), a stoichiometric level (a theoretic air-fuel ratio) and a rich level (a rich air-fuel mixture) to the other.

Figure 5:
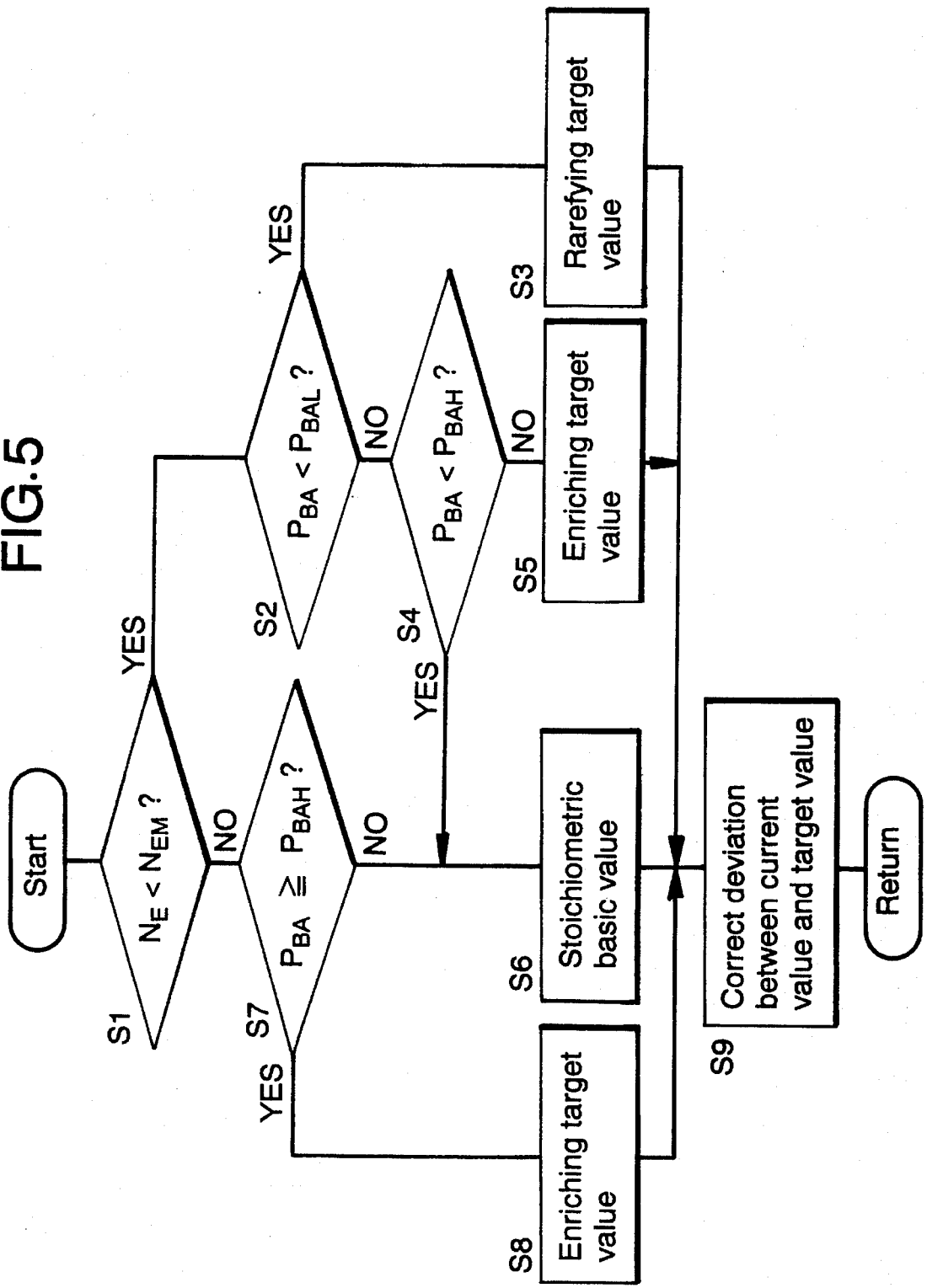
FIG. 5 is a flow chart illustrating an air-fuel ratio controlling procedure.

At first step S1 in FIG. 5, it is judged whether the engine revolution number $N_E$ is lower than a preset revolution number $N_{EM}$. If $N_E < N_{EM}$, then it is judged at second step S2 whether the intake absolute pressure $P_{BA}$ is lower than a preset lower intake absolute pressure $P_{BAL}$. If $P_{BA} < P_{BAL}$, then a rarefying target value is determined at third step S3.

If it is decided at second step S2 that the intake absolute pressure $P_{BA}$ is equal to or higher than the preset lower absolute pressure $P_{BAL}$ ($P_{BA} \geq P_{BAL}$), it is judged at fourth step S4 whether the intake absolute pressure $P_{BA}$ is lower than a preset higher intake absolute pressure $P_{BAH}$. If the intake absolute pressure $P_{BA}$ is equal to or higher than a preset higher intake absolute pressure $P_{BAH}$ ($P_{BA} \geq P_{BAG}$), then an enriching target value is set at fifth step S5. If $P_{BA} < P_{BAG}$), then a stoichiometric basic value is determined at sixth step S6.

Further, if it is decided at first step S1 that the engine revolution number $N_E$ is equal to or greater than the preset revolution number $N_{EM}$ ($N_E \geq N_{EM}$), it is judged at seventh step S7 whether the intake absolute pressure $P_{BA}$ is equal to or higher than the preset higher intake absolute pressure $P_{BAH}$. If $P_{BA} < P_{BAH}$, the stoichiometric basic value is determined at sixth step S6. If $P_{BA} \geq P_{BAH}$, an enriching target value is determined at eighth step S8.

At ninth step S9 after setting of the target values at third, fifth, sixth and eighth steps S3, S5, S6 and S8, the air-fuel ratio is controlled to correct the deviation between the current value and the target value.

Figure 6:
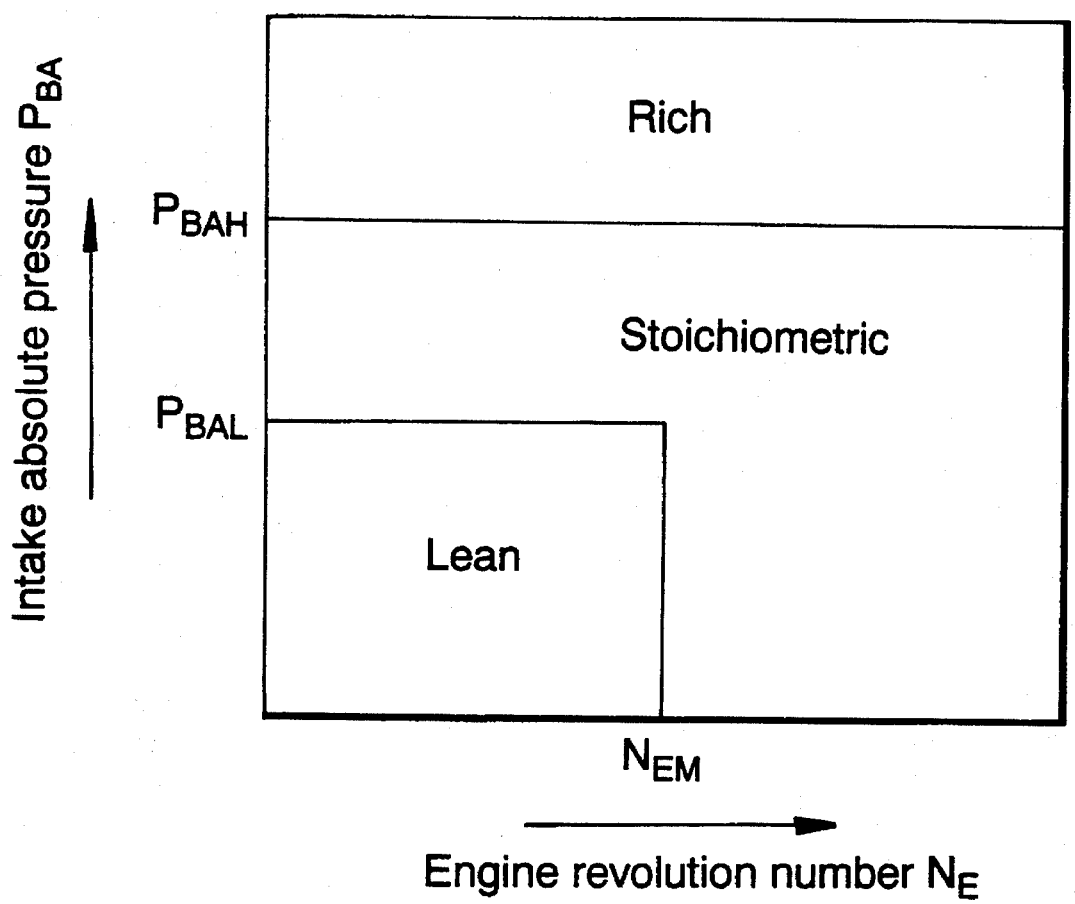
FIG. 6 is a diagram illustrating an air-fuel ratio switching map determined by the control procedure shown in FIG. 5.

Such control ensures that the air-fuel ratio is switched, as shown in FIG. 6, under an engine operating condition determined by an engine load represented by the engine revolution number $N_E$ and the intake absolute pressure $P_{BA}$.

The air-fuel ratio may be controlled by carrying, in parallel to each other, the control of the bypassing air amount by the bypass solenoid control valve 59 and the first idle solenoid control valve 60, and the control of the amount of exhaust gas circulated attendant upon the control of the opening degree of the exhaust gas circulation control valve 69 by the electromagnetic pilot valve 70 in addition to the control of the amount of fuel injected by the fuel injection valve 61.

Figure 7:
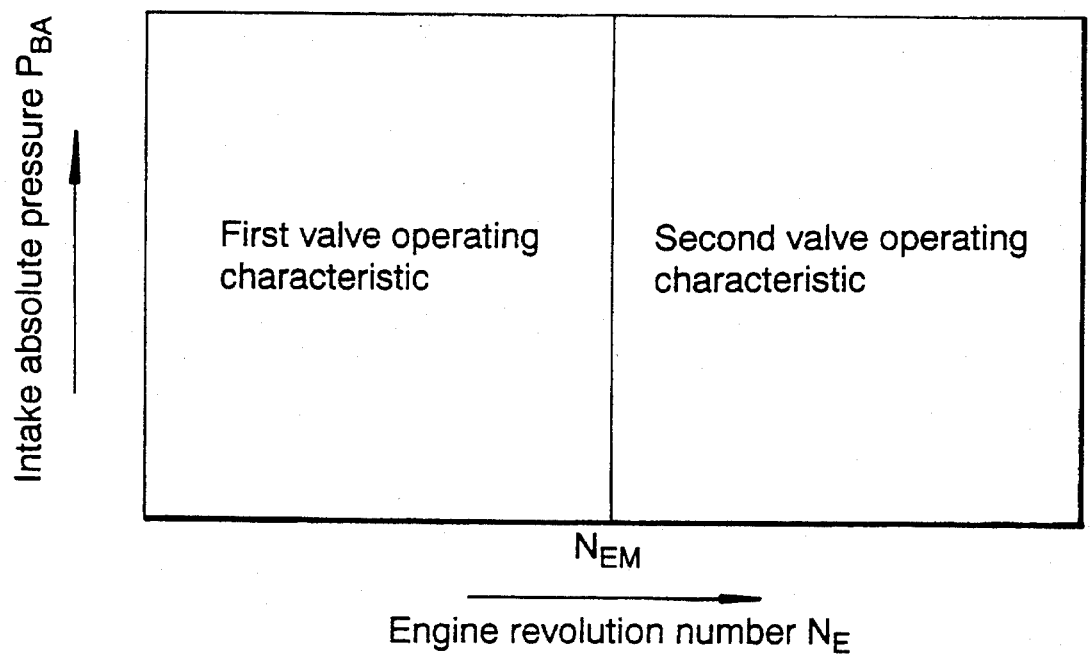
FIG. 7 is a diagram illustrating a valve operating characteristic switching map suited to an engine operating condition.

The control means 72 is capable of controlling the valve operating characteristic for the intake valves $V_{f1}$ and $V_{f2}$ in accordance with the engine operating condition to change, from one to the other, (1) the first valve operating characteristic that one of the intake valves $V_{f1}$ is opened and closed by the first intake-side cam 33, while the other intake valve $V_{f2}$ is substantially stopped by the substantially stopping cam 35, and (2) the second valve operating characteristic that both the intake valves $V_{f1}$ and $V_{f2}$ are opened and closed by the second intake-side cam 34. As shown in FIG. 7, the first valve operating characteristic is a valve operating characteristic for providing an engine output substantially adapted for a range where the engine revolution number $N_E$ is lower than the preset engine revolution number $N_{EM}$. The second valve operating characteristic is a valve operating characteristic for providing an engine output substantially adapted for a region where the engine revolution number $N_E$ is equal to or higher than the preset engine revolution number $N_{EM}$.

Figure 8:
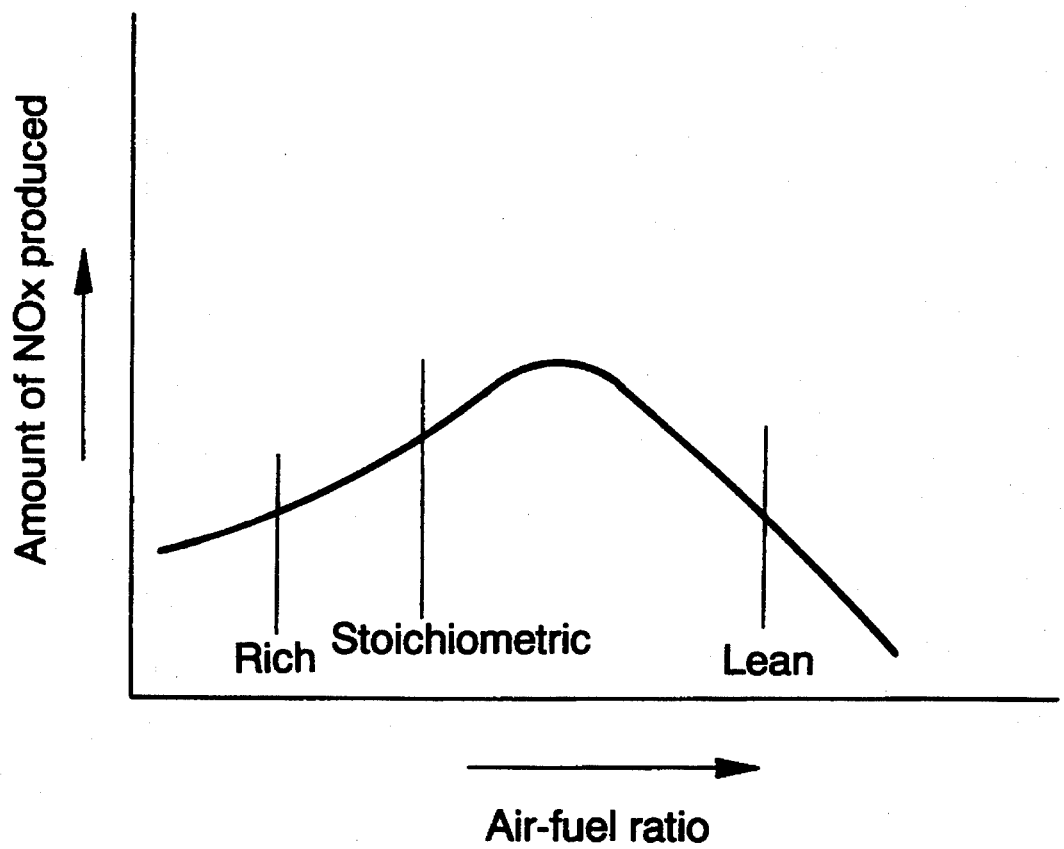
FIG. 8 is a diagram illustrating a variation in amount of NOx produced in accordance with a variation in air-fuel ratio.

However, in the control of the valve operating characteristic for the intake valves $V_{f1}$ and $V_{f2}$ according to a valve operating characteristic switching map shown in FIG. 7, when the air-fuel ratio is switched from the lean level to the stoichiometric level as well as from the stoichiometric level to the rich level in the region the engine revolution number $N_E$ is lower than the preset engine revolution number $N_{EM}$, a torque shock is produced, if the switching is sudden. In order to moderate the torque shock, the air-fuel ratio may be gradually changed; however, when the air-fuel ratio is changed from the stoichiometric level to the rich level, the amount of NOx generated is decreased, as shown in FIG. 8. The amount of NOx produced during this time is less varied and hence, the air-fuel ratio may be gradually changed. However, in the course of changing of the air-fuel ratio from the lean level to the stoichiometric level, the amount of NOx produced in an exhaust gas is maximized, as shown in FIG. 8. If the air-fuel ratio is gradually changed from the lean level to the stoichiometric level, the amount of NOx produced is increased. Thereupon, the control means 72 switches the valve operating characteristic for the intake valves $V_{f1}$ and $V_{f2}$ according to a control procedure shown in FIG. 9, thereby moderating the torque shock generated upon switching of the air-fuel ratio from the lean level to the stoichiometric level in a state in which the engine revolution number $N_E$ is lower than the preset revolution number $N_{EM}$.

Figure 9:
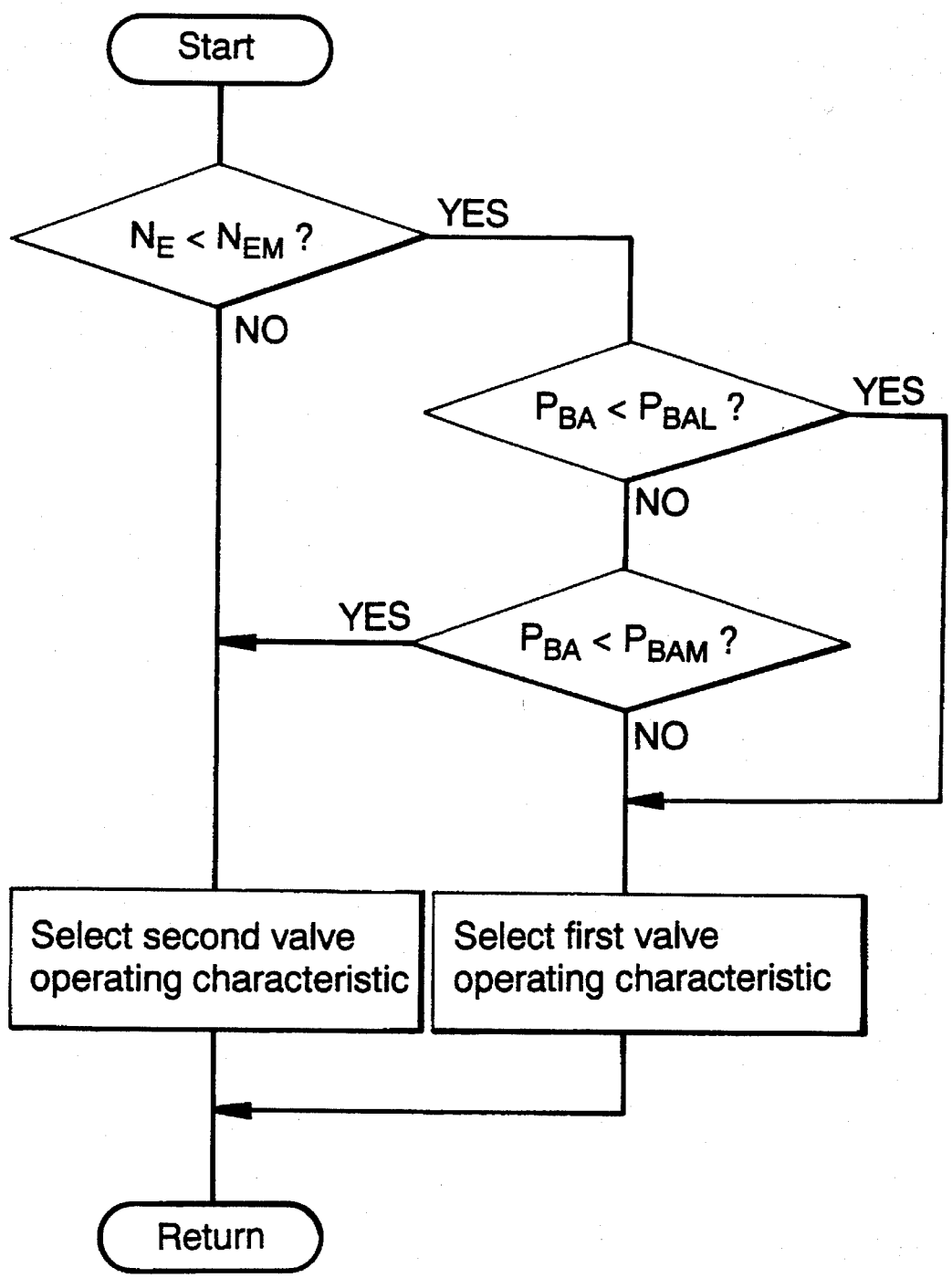
FIG. 9 is a flow chart illustrating a procedure of switching the valve operating characteristic for intake valves.

According to the control procedure shown in FIG. 9, in a state in which the engine revolution number $N_E$ is equal to or higher than the preset revolution number $N_{EM}$, the second valve operating characteristic permitting both the intake valves $V_{f1}$ and $V_{f2}$ to be opened and closed by the second intake valve-side cam 34 is selected. A preset middle intake absolute pressure $P_{BAM}$ is also set which is a middle value between the preset lower intake absolute pressure $P_{BAL}$ and the preset higher intake absolute pressure $P_{BAH}$. When the engine revolution number $N_E$ is lower than the preset revolution number $N_{EM}$ and when the intake absolute pressure $P_{BA}$ is equal to or higher than the preset higher intake absolute pressure $P_{BAH}$ and lower than the preset middle intake absolute pressure $P_{BAM}$, the second valve operating characteristic is selected, and in the other cases, the first valve characteristic is selected.

Figure 10:
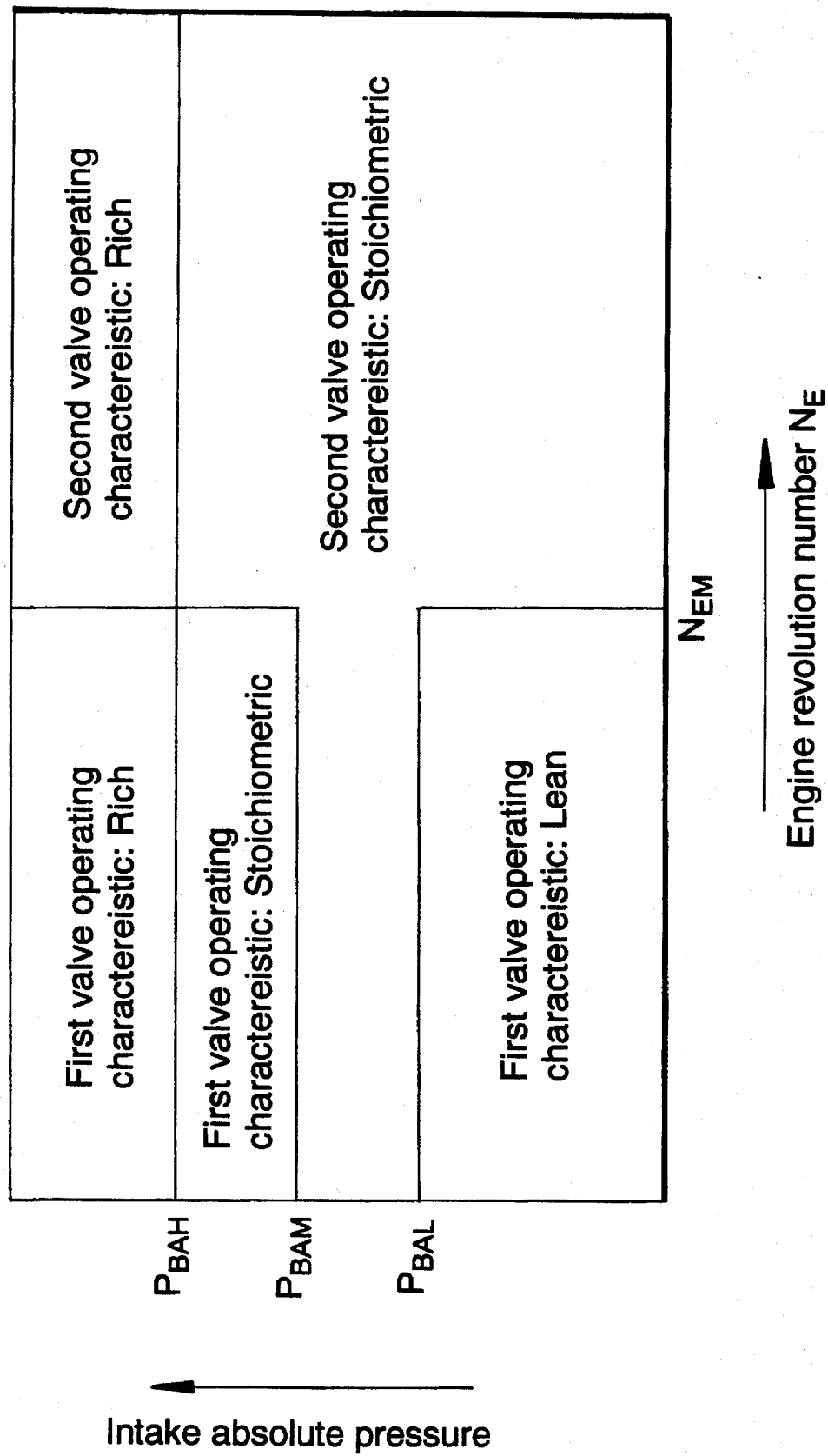
FIG. 10 is a diagram illustrating a map for switching the air-fuel ratio and the valve operating characteristic.

The combination of the switching of the air-fuel ratio determined by the control procedure shown in FIG. 5 with the switching of the valve operating characteristic according to the control procedure shown in FIG. 9 is as shown in FIG. 10. Thus, when the air-fuel ratio is changed from the lean level to the stoichiometric level under the operating condition in which the engine revolution number $N_E$ is lower than the preset revolution number $N_{EM}$, the valve operating characteristic for the intake valves $V_{f1}$ and $V_{f2}$ is changed from the first valve operating characteristic which is an operating condition-suited valve operating characteristic suited for the engine operating condition in which the engine revolution number $N_E$ is lower than the preset revolution number $N_{EM}$, via the second valve operating characteristic which is an operating condition-unsuited valve operating characteristic that is not suited for the engine operating condition in which the engine revolution number $N_E$ is lower than the preset revolution number $N_{EM}$, to the first valve operating characteristic which is the operating condition-suited valve operating characteristic. Moreover, as shown in FIG. 11, the output torque based on the second valve operating characteristic in the stoichiometric state is a middle value between the output torque based on the first valve operating characteristic in the lean state and the output torque based on the first valve operating characteristic in the stoichiometric state.

The operation of the first embodiment will be described below. In changing the air-fuel ratio from the lean level to the stoichiometric level under the engine operating condition in which the engine revolution number $N_E$ is lower than the preset revolution number $N_{EM}$, the intake valves $V_{I1}$ and $V_{I2}$ are controlled so that the valve operating characteristic is changed from the first valve operating characteristic which is the operating condition-suited valve operating characteristic, via the second valve operating characteristic which is the operating condition-unsuited valve operating characteristic, to the first valve operating characteristic which is the operating condition-suited valve operating characteristic. In the second valve operating characteristic, the output torque which is the middle value of the output torque before and after changing of the air-fuel ratio is obtained between the operating condition-suited valve operating characteristic (the first valve operating characteristic) before the changing of the air-fuel ratio and the operating condition-unsuited valve operating characteristic (the first valve operating characteristic) after the switching of the air-fuel ratio.

Figure 11:
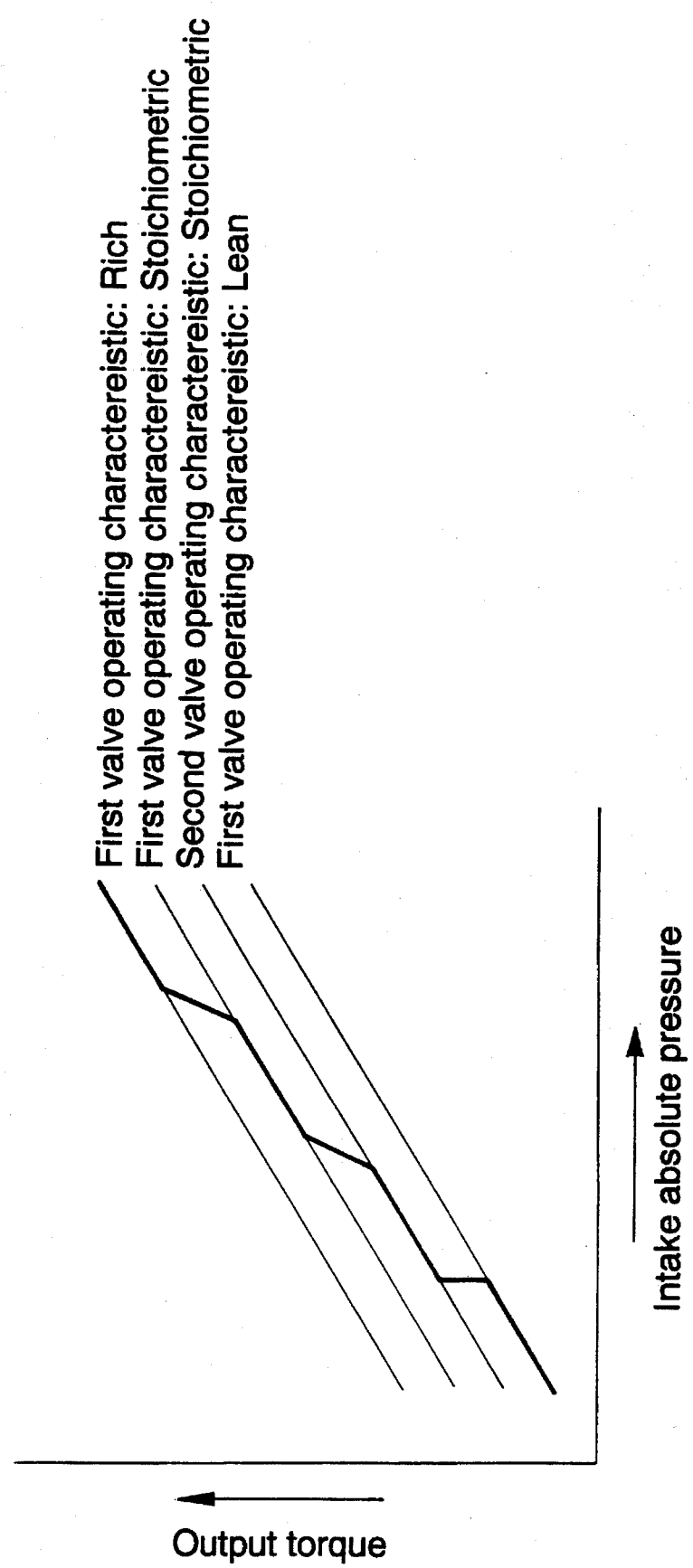
FIG. 11 is a diagram illustrating a variation in output torque attendant upon the switching of the air-fuel ratio and the valve operating characteristic.

Therefore, it is possible to stepwise vary the output torque in response to the variation in intake absolute pressure $P_{BA}$, as shown in FIG. 11, and to promptly perform the switching between the lean state and the stoichiometric state to moderate the torque shock, while avoiding an increase in amount of NOx produced.

FIGS. 12 to 18 illustrate a second embodiment of the present invention, wherein portions or components corresponding to those in the first embodiment are designated by like reference characters.

Referring first to FIGS. 12 and 14, a first intake-side rocker arm 28' is operatively connected to one of the intake valves $V_{I1}$, and a third intake-side rocker arm 30' is operatively connected to the other intake valves $V_{I2}$. A second intake-side rocker arm 29' is disposed between the first and third intake-side rocker arms 29' and 30' and capable of being liberated relative to the intake valves $V_{I1}$ and $V_{I1}$.

A first valve operating characteristic switchover means 45 is provided in the first, second and third intake-side rocker arms 28', 29' and 30' and capable of switching the connection and disconnection of the rocker arms 28', 29' and 30' to and from one another, and a second valve operating characteristic switchover means 73 is provided between the first and third intake-side rocker arms 28' and 30' and capable of switching the connection and disconnection of the rocker arms 28' and 30' to and from each other.

A connecting arm portion 74 is integrally provided on the first intake-side rocker arm 28' at a location closer to the intake valves $V_{I1}$ and $V_{I2}$ than the intake-side rocker shaft 37' to extend astride the second intake-side rocker arm 29' toward the third intake-side rocker arm 30'. The second valve operating characteristic switchover means 73 is provided to be able to switch the connection and disconnection of the connecting arm portion 74 and the third intake-side rocker arm 30' to and from each other, and the first valve operating characteristic switchover means 45 having basically the same construction as the valve operating characteristic switchover means 45 in the first embodiment is provided in the first, second and third intake-side rocker arms 28', 29' and 30' on the opposite side of the intake-side rocker shaft 37' from the second valve operating characteristic switchover means 73.

As best shown in FIG. 14, the second valve operating characteristic switchover means 73 includes a connecting piston 75 capable of connecting the first and third intake-side rocker arms 28' and 30', a limiting member 76 for limiting the movement of the connecting piston 75, and a return spring 77 for biasing the connecting piston 75 and the limiting member 76 in a disconnecting direction.

A bottomed guide hole 78 opening toward the third intake rocker arm 30' is provided in the connecting arm portion 74 of the first intake-side rocker arm 28' in parallel to the intake-side rocker shaft 37'. The connecting piston 75 is slidably received in the guide hole 78, and a hydraulic pressure chamber 79 is defined between one end of the connecting piston 75 and a closed end of the guide hole 78. The connecting piston 75 is formed in an expandable and contractible manner to exhibit a spring force, and includes a bottomed cylindrical portion 80 slidably received in the guide hole 78 with its closed end facing the hydraulic pressure chamber 79, a short columnar portion 81 slidably received in the guide hole 78, and a spring 82 mounted under compression between the bottomed cylindrical portion 80 and the short columnar portion 81. Moreover, an annular notch is provided in an outer surface of the bottomed cylindrical portion 80 at its opened end to define a first annular engage groove 83 between one end face of the short columnar portion 81 and the bottomed cylindrical portion 80, when the opened end of the bottomed cylindrical portion 80 is put into abutment against the one end face of the short columnar portion 81. A second annular engage groove 84 is provided in an outer periphery of the bottomed cylindrical portion 80. Moreover, the spring 82 has a preset load which is set smaller than that of the return spring 77.

A bottomed guide hole 85 corresponding to the guide hole 78 is provided in the third intake-side rocker arm 30' in parallel to the intake-side rocker shaft 37' and opens toward the connecting arm portion 74, and the bottomed cylindrical limiting member 76 abutting against the other end of the short columnar portion 81 is slidably received in the guide hole 85. The return spring 77 is mounted under compression between a closed end of the guide hole 85 and the closed end of the limiting member 76, so that the connecting piston 75 and the limiting member 76 abutting against each other are biased toward the hydraulic pressure chamber 79 by a spring force of the return spring 77.

A trigger mechanism 86 is mounted to the second valve operating characteristic switchover means 73 for limiting the timing of operation of the second valve operating characteristic switchover means 73. The trigger mechanism 86 includes a trigger plate 87 which is swingable relative to the intake-side rocker arms 28', 29' and 30' about an axis of the intake-side rocker shaft 37' between a position in which it is engaged into the first engage groove 83 or the second engage groove 84 in the connecting piston 75 to limit the movement of the connecting piston 75 and a position in which it is disengaged from the first engage groove 83 or the second engage groove 84 to permit the movement of the connecting piston 75.

A slit 88 is provided in an upper portion of the first intake-side rocker arm 28', and guide portions 89, 89 are projectingly provided on the upper portion of the first intake-side rocker arm 28' to extend upwardly and are connected to opposite sides of the slit 88. The slit 88 is provided in the upper portion of the first intake-side rocker arm 28' so as to correspond to the first engage groove 83 in a condition in which the bottomed cylindrical portion 80 and the short columnar portion 81 of the connecting piston 75 have been displaced to the maximum toward the hydraulic pressure chamber 79, as shown in FIG. 14. The second engage groove 84 is provided in the outer periphery of the bottomed cylindrical portion 80 so as to assume a position corresponding to the slit 88 in a condition in which the bottomed cylindrical portion 80 and the short columnar portion 81 abutting against each other have been moved to the maximum away from the hydraulic pressure chamber 79.

A cylindrical collar 90 is fitted into the intake-side rocker shaft 37' between the first intake-side rocker arm 28' and one of the holders 32, and a cylindrical collar 91 is fitted into the intake-side rocker arm 37' between the other holder 32 and the third intake-side rocker arm 30', so that the movements of the intake-side rocker arms 28', 29' and 30' along the intake-side rocker shaft 37' are limited by the collars 90 and 91.

The trigger plate 87 is relatively turnably carried on one of the collars 90. The trigger plate 87 is integrally provided with an engage plate portion 87a which is disengageably brought into engagement into the first engage groove 83 or the second engage groove 84 from the slit 88, while its opposite sides are in sliding contact with the guide portion 89, 89.

A stopper pin 93 is embedded in the holder 32 opposed to the first intake-side rocker arm 28' to extend toward the first intake-side rocker arm 28', and a stopper 87b is provided on the trigger plate 87 to project therefrom and capable of abutting against the stopper pin 93 from below. A torsion spring 94 surrounding the collar 90 is locked at one end thereof to the stopper pin 93 and at the other end to the trigger plate 87 from above. Thus, the trigger plate 87 is biased in a direction to bring the stopper 87b into abutment against the stopper pin 93 by the torsion spring 94. The position of the stopper pin 93 is determined so that when the first intake-side rocker arm 28' is in a stationary state with the stopper 87b abutting against the stopper pin 93, the engage plate portion 87a of the trigger plate 87 is engageable into the engage groove 83 or 84 from the slit 88, and when the first intake-side rocker arm 28' is swung in a valve opening direction, the engage plate portion 87a is disengaged from the slit 88.

Following states are switched over from one to another by the first hydraulic pressure control valve 95: (1) a state in which a hydraulic pressure is released from the first valve operating characteristic switchover means 45 to release the connection of the first, second and third intake-side rocker arms 28', 29' and 30'; and (2) a state in which the hydraulic pressure is applied from the hydraulic pressure source 45 to the first valve operating characteristic switchover means 45 to connect the first, second and third intake-side rocker arms 28', 29' and 30' to one another. Following states are switched over from one to another by a second hydraulic pressure control valve 96: (1) a state in which the hydraulic pressure is released from the second valve operating characteristic switchover means 73 to release the connection of the first and third intake-side rocker arms 28' and 30'; and (2) a state in which the hydraulic pressure is applied from the hydraulic pressure source 45 to the second valve operating characteristic switchover means 73 to connect the first and third intake-side rocker arms 28' and 30' to each other. The operations of the hydraulic pressure control valves 95 and 96 are controlled by a control means 72.

Thus, it is possible to control the operating characteristic for the intake valves $V_{I1}$ and $V_{I2}$ so as to switch, from one to the other, (1) a first valve operating characteristic in which the connection of the first, second and third intake-side rocker arms 28', 29' and 30' is released by independently controlling the operations of the first and second valve operation switchover means 45 and 73, thereby opening and closing one of the intake valves $V_{I1}$ and $V_{I2}$ by the first intake-side cam 33, while substantially stopping the other intake valve $V_{I2}$ by he substantially stopping cam 35, (2) a second valve operating characteristic in which the first and third intake-side rocker arms 28' and 30' are connected to each other to open and close both the intake valves $V_{I1}$ and $V_{I2}$ by the first intake-side cam 33, and (3) a third valve operating characteristic in which all the first, second and third intake-side rocker arms 28', 29' and 30' are connected to one another to open and close both the intake valves $V_{I1}$ and $V_{I2}$ by the second intake-side cam 34.

The air-fuel ratio is switched, as shown in FIG. 15. More specifically, in a region where the engine revolution number $N_E$ is lower than a preset lower revolution number $N_{EL}$ and the intake absolute pressure $P_{BA}$ is lower than a preset lower intake absolute pressure $P_{BAL}$, a lean state is selected. In a region where the intake absolute pressure $P_{BA}$ is equal to or higher than a preset higher intake absolute pressure $P_{BAH}$, a rich state is selected. Further, in the other region, a stoichiometric state is selected.

On the other hand, it is possible to provide an output suited to the engine operating conditions to the intake valves $V_{I1}$ and $V_{I2}$ by selecting one of the valve operating characteristics shown in FIG. 16. More specifically, in a region where the engine revolution number $N_E$ is equal to or higher than the preset higher revolution number $N_{EH}$ and the intake absolute pressure $P_{BA}$ is equal to or higher than the preset lower intake absolute pressure $P_{BAL}$, a third valve operating characteristic is an operating condition-suited valve operating characteristic. In a region where the engine revolution number $N_E$ is lower than the preset lower revolution number $N_{EL}$, a first valve operating characteristic is an operating condition-suited valve operating characteristic. Further, in the other region, a second valve operating characteristic is an operating condition-suited valve operating characteristic.

However, in the switching control of the valve operating characteristic for the intake valves $V_{I1}$ and $V_{I2}$ according to a valve operating characteristic switching map shown in FIG. 16, a torque shock is produced, when the air-fuel ratio is changed from the lean level to the stoichiometric level in response to the intake absolute pressure $P_{BA}$ becoming equal to or higher than the preset lower intake absolute pressure $_{BAL}$, and when the air-fuel ratio is changed from the lean level to the stoichiometric level in response to the engine revolution number $N_E$ becoming equal to or higher than the preset lower revolution number $N_{EL}$. If the air-fuel ratio is slowly changed to moderate the torque shock, the amount of NOx produced is increased. Therefore, in order to moderate the torque shock, while avoiding the increase in amount of NOx produced, the valve operating characteristics for the intake valves $V_{I1}$ and $V_{I2}$ and the air-fuel ratio are set as shown in FIG. 17.

More specifically, in switching the air-fuel ratio from the lean level to the stoichiometric level in a region where the engine revolution number $N_E$ is lower than the preset lower revolution number $N_{EL}$, the valve operating characteristic for the intake valves $V_{I1}$ and $V_{I2}$ is switched from a first valve operating characteristic which is an operating condition-suited valve operating characteristic in the region where the engine revolution number $N_E$ is lower than the preset lower revolution number $N_{EL}$, via third and second valve operating characteristics which are operating condition-unsuited valve operating characteristics not suited the operating condition after switching of the air-fuel ratio, to the first valve operating characteristic which is the operating condition-suited valve operating characteristic. Moreover, as shown in FIG. 18, the output torque based on the third valve operating characteristic is a middle value between the output torque based on the first valve operating characteristic in the lean state and the output torque based on the second valve operating characteristic in the stoichiometric state. The output torque based on the second valve operating characteristic in the stoichiometric state is a middle value between the output torque based on the third valve operating characteristic and the output torque based on the first valve operating characteristic in the stoichiometric state.

In changing the air-fuel ratio from the lean level to the stoichiometric level in response to the engine revolution number $N_E$ becoming equal to or higher than the preset lower revolution number $N_{EL}$, the valve operating characteristic for the intake valves $V_{I1}$ and $V_{I2}$ is switched from the first valve operating characteristic which is the operating condition-suited valve operating characteristic in the region where the engine revolution number $N_E$ is lower than the preset lower revolution number $N_{EL}$, via the third valve operating characteristic which is the operating condition-unsuited valve operating characteristic in the region where the intake absolute pressure $P_{BA}$ is lower than the preset lower intake absolute pressure $P_{BAL}$ and the engine revolution number $N_E$ is equal to or higher than the preset lower revolution number $N_{EL}$, to the second valve operating characteristic which is the operating condition-suited valve operating characteristic in the region where the intake absolute pressure $P_{BA}$ is lower than the preset lower intake absolute pressure $P_{BAL}$ and the engine revolution number $N_E$ is equal to or higher than the preset lower revolution number $N_{EL}$.

Even in the second embodiment, in switching the air-fuel ratio from the lean level to the stoichiometric level, it is possible to moderate the torque shock while inhibiting the generation of NOx during the switching control of the air-fuel ratio between the lean level and the stoichiometric level by controlling the valve operating characteristic for the intake valves $V_{I1}$ and $V_{I2}$ for switching it from the operating condition-suited valve operating characteristic suited to the operating condition before the switching of the air-fuel ratio, via the operating condition-unsuited valve operating characteristic which is not suited to the operating condition after the switching of the air-fuel ratio, to the operating condition-suited valve operating characteristic which is suited to the operating condition after the switching of the air-fuel ratio.

Although the embodiments of the present invention have been described in detail, it will be understood that the present invention is not limited to the above-described embodiments, and various modifications in design may be made without departing from the spirit and scope of the invention defined in the claims.

For example, in place of the intake absolute pressure $P_{BA}$, the engine load may be represented by the throttle opening degree $\theta_{TH}$.

What is claimed is:

1. A method for controlling a valve operating characteristic and an air-fuel ratio in an internal combustion engine in which the valve operating characteristic for an intake valve can be switched over between a plurality of operating condition-suited valve operating characteristics suited to an engine operating condition represented by at least one of an engine revolution number and an engine load, and the air-fuel ratio can be switched over between a relatively lean level and a relatively rich level, said method comprising the steps of:

switching over the air-fuel ratio in accordance with a change in the engine operating condition; and switching over the valve operating characteristic for said intake valve substantially synchronously with the switching over of the air-fuel ratio, from one operating condition-suited valve operating characteristic suited to one engine operating condition before the switching over of the air-fuel ratio to another operating condition-suited valve operating characteristic suited to another engine operating condition after the switching over of the air-fuel ratio, via an operating condition-unsuited valve operating characteristic which is not suited to said another engine operating condition after the switching over of the air-fuel ratio, so as to provide an engine output which is of an intermediate level between the engine outputs before and after the switching over of the air-fuel ratio.

\* \* \* \* \*